J. C. AMBROSE.
Animal-Trap.
No. 196,549        Patented Oct. 30, 1877.
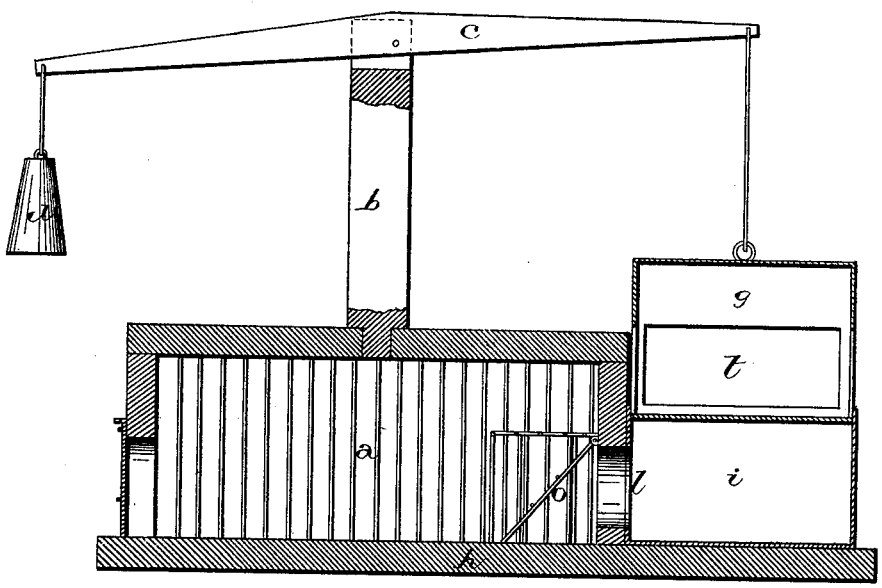

UNITED STATES PATENT OFFICE.

JOHN C. AMBROSE, OF HILLSBOROUGH, OHIO.

IMPROVEMENT IN ANIMAL-TRAPS.

Specification forming part of Letters Patent No. 196,549, dated October 30, 1877; application filed August 11, 1877.

*To all whom it may concern:*

Be it known that I, JOHN C. AMBROSE, of Hillsborough, in the county of Highland and State of Ohio, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in a box which has an opening through all of its sides, so that the animal can enter from any one except the inner side, and can see straight through, and which is applied to one end of a scale-beam, and so balanced that whenever an animal of any kind enters the box for the purpose of reaching the bait the box at once sinks downward with it to the bottom of the guide, in which it moves, and just opposite an opening into the cage, as will be more fully described hereinafter.

The accompanying drawing represents my invention.

$a$ represents an ordinary cage, of any desired form, shape, or construction, but which is here shown as open upon two of its sides, so that the light can pass freely through. Upon the top of this cage is placed the standard $b$, in the top of which is pivoted the beam $c$, which has a weight, $d$, attached to one end, and the box $g$ to the other. The weight and the box are so arranged that the weight will just slightly counterbalance the box, and thus keep the box raised upward to its full extent whenever it is left free to move. The box has a portion of its sides cut away on all of its sides, as shown, so that bait of any kind that may be placed therein can be clearly visible to any animals that may approach the box.

Secured to one end of the base $h$, upon which the trap $a$ is secured, is another box, $i$, which is open at its top, and into which the box $g$ sinks. This box $i$ has an opening, $l$, through one of its sides, which communicates with the opening through that end of the trap, and this lower box serves as a guide to the box $g$ in its vertical play.

The operation of the trap is as follows: The weight is adjusted upon the beam so as to slightly overbalance the box $g$ and any bait that may be placed therein. The animal, seeing the bait in the box, passes through one of the openings in its sides, and no sooner is its weight placed upon the bottom of the box $g$ than the box sinks downward to the bottom of the box $i$, carrying the animal with it. The sides of the box $i$ cover over the openings in the sides of the box $g$, so that the only way of escape for the animal is through the hole in the end of the trap, when the box $g$, being freed, at once rises into position again, and is thus automatically set again. After the animal once passes into the trap the guard $o$ prevents its escape back by the way through which he came.

Various devices may be applied to the standard for the purpose of preventing the beam from being drawn down too far at its weighted end; but a small pin passed through the recess in its top, so as to act as a stop to the lever, is preferable.

It will be seen that the box $g$ has an opening, $t$, through every side, not only so that the animal can enter from any one except the inner side, but so that the animal can see straight through the box.

Many animals will not enter a box or anything that has a suspicious look to them, but will not hesitate to walk into a box as long as they can see through the other side.

I am aware of the patent to Stowe and Loop, April 25, 1871, and this I disclaim.

I am also aware that traps have been constructed with openings clear through their various sides, and such I do not broadly claim.

Having thus described my invention, what I claim, and desire to secure by Letters Patent, is—

In a trap constructed substantially as described, the box $g$, having an opening, $t$, through each side, and being arranged to rise above the top of the box $i$, so that the animal can see straight through, as described and shown.

In testimony that I claim the foregoing I have hereunto set my hand this 23d day of July, 1877.

JOHN C. AMBROSE.

Witnesses:
ROBERT R. WATTS,
LUMMA HEAD.